US012794908B2

(12) United States Patent
Fukumoto

(10) Patent No.: US 12,794,908 B2
(45) Date of Patent: Nov. 10, 2026

(54) VEHICLE CONTROL DEVICE AND VEHICLE CONTROL METHOD

(71) Applicant: Panasonic Automotive Systems Co., Ltd., Kanagawa (JP)

(72) Inventor: Satoshi Fukumoto, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 19/058,713

(22) Filed: Feb. 20, 2025

(65) Prior Publication Data

US 2025/0280011 A1 Sep. 4, 2025

(30) Foreign Application Priority Data

Feb. 29, 2024 (JP) ................................ 2024-029692

(51) Int. Cl.

*H04L 9/40* (2022.01)
*B60W 50/035* (2012.01)
*B60W 50/038* (2012.01)
*B60W 50/14* (2020.01)

(52) U.S. Cl.

CPC ....... *H04L 63/1416* (2013.01); *B60W 50/035* (2013.01); *B60W 50/038* (2013.01); *B60W 50/14* (2013.01)

(58) Field of Classification Search

CPC ..... H04L 9/40; H04L 63/1441; H04L 63/146; H04L 63/1416; B60W 50/0098; B60W 50/035; B60W 50/038; B60W 50/14; B60W 60/00; B60W 60/0053; B60W 60/0057; B60W 2050/146; B60W 2510/20; B60W 2520/10; B60W 2554/802

USPC .................................................. 701/23, 29.2

See application file for complete search history.

(56) References Cited

U.S. PATENT DOCUMENTS

| | | | | |
|---|---|---|---|---|
| 11,283,819 | B2 * | 3/2022 | Choi | H04L 63/1416 |
| 11,921,853 | B2 * | 3/2024 | Filipek | G06F 21/554 |
| 12,248,579 | B1 * | 3/2025 | Newman | G06F 8/65 |
| 2022/0032966 | A1 * | 2/2022 | Senda | B60W 50/023 |
| 2023/0075593 | A1 | 3/2023 | Miyauchi et al. | |
| 2025/0145182 | A1 * | 5/2025 | Fukumoto | B60W 60/00188 |

FOREIGN PATENT DOCUMENTS

| | | |
|---|---|---|
| JP | 5387549 | 1/2014 |
| JP | 2023-039790 | 3/2023 |

* cited by examiner

*Primary Examiner* — Andrew Joseph Rudy

(74) *Attorney, Agent, or Firm* — Greenblum & Bernstein, P.L.C.

(57) ABSTRACT

A vehicle control device includes: a detector that detects a cyber-attack on an in-vehicle system provided in a vehicle; a determiner that determines whether a state of the in-vehicle system is an online state or an offline state when the cyber-attack is detected; and a controller that makes a behavior of the vehicle related to travelling of the vehicle different between a case where the state of the in-vehicle system is determined to be the online state by the determiner and a case where the state of the in-vehicle system is determined to be the offline state by the determiner. The online state is a state in which communication is possible between the in-vehicle system and equipment outside the vehicle via a communication network, and the offline state is a state in which such communication is not possible.

11 Claims, 6 Drawing Sheets

VEHICLE CONTROL DEVICE AND VEHICLE CONTROL METHOD

CROSS REFERENCE TO RELATED APPLICATION

The present application is based on and claims priority of Japanese Patent Application No. 2024-029692 filed on Feb. 29, 2024.

FIELD

The present disclosure relates to a vehicle control device provided in a vehicle.

BACKGROUND

Conventionally, an information processing device has been proposed as a vehicle control device to be provided in a vehicle (see, for example, Patent Literature (PTL) 1). This information processing device checks whether wireless communication is possible between the vehicle and a security center. Then, when security event information corresponding to a cyber-attack occurs within the vehicle, if wireless communication thereof is possible, the information processing device transmits the security event information to the security center. As a result, the information processing device obtains response instructions corresponding to the security event information from the security center. On the other hand, when the security event information occurs, if wireless communication is not possible, the information processing device notifies the inside of the vehicle of response instructions that are predetermined according to the security event information.

CITATION LIST

Patent Literature

PTL 1: Japanese Unexamined Patent Application Publication No. 2023-39790

SUMMARY

However, the information processing device according to PTL 1 can be improved upon.

In view of this, the present disclosure provides a vehicle control device and the like capable of improving upon the above related art.

A vehicle control device according to one embodiment of the present disclosure includes: a detector that detects a cyber-attack on an in-vehicle system provided in a vehicle; a determiner that determines whether a state of the in-vehicle system is an online state or an offline state when the cyber-attack is detected; and a controller that makes a behavior of the vehicle related to travelling of the vehicle different between a case where the state of the in-vehicle system is determined to be the online state by the determiner and a case where the state of the in-vehicle system is determined to be the offline state by the determiner, wherein the online state is a state in which communication is possible between the in-vehicle system and equipment outside the vehicle via a communication network, and the offline state is a state in which communication is not possible between the in-vehicle system and the equipment via the communication network.

It should be noted that these comprehensive or specific aspects may be realized by a system, a method, an integrated circuit, a computer program, or a recording medium such as a computer-readable CD-ROM, or may be realized by any combination of a system, a method, an integrated circuit, a computer program, and a recording medium. In addition, the recording medium may be a non-transitory recording medium.

The vehicle control device of the present disclosure is capable of improving upon the above related art.

It should be noted that further advantages and effects of one aspect of the present disclosure will become apparent from the specification and drawings. Such advantages and/or effects are provided by some of the embodiments and configurations described in the specification and drawings, but not all of the configurations are necessarily required.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
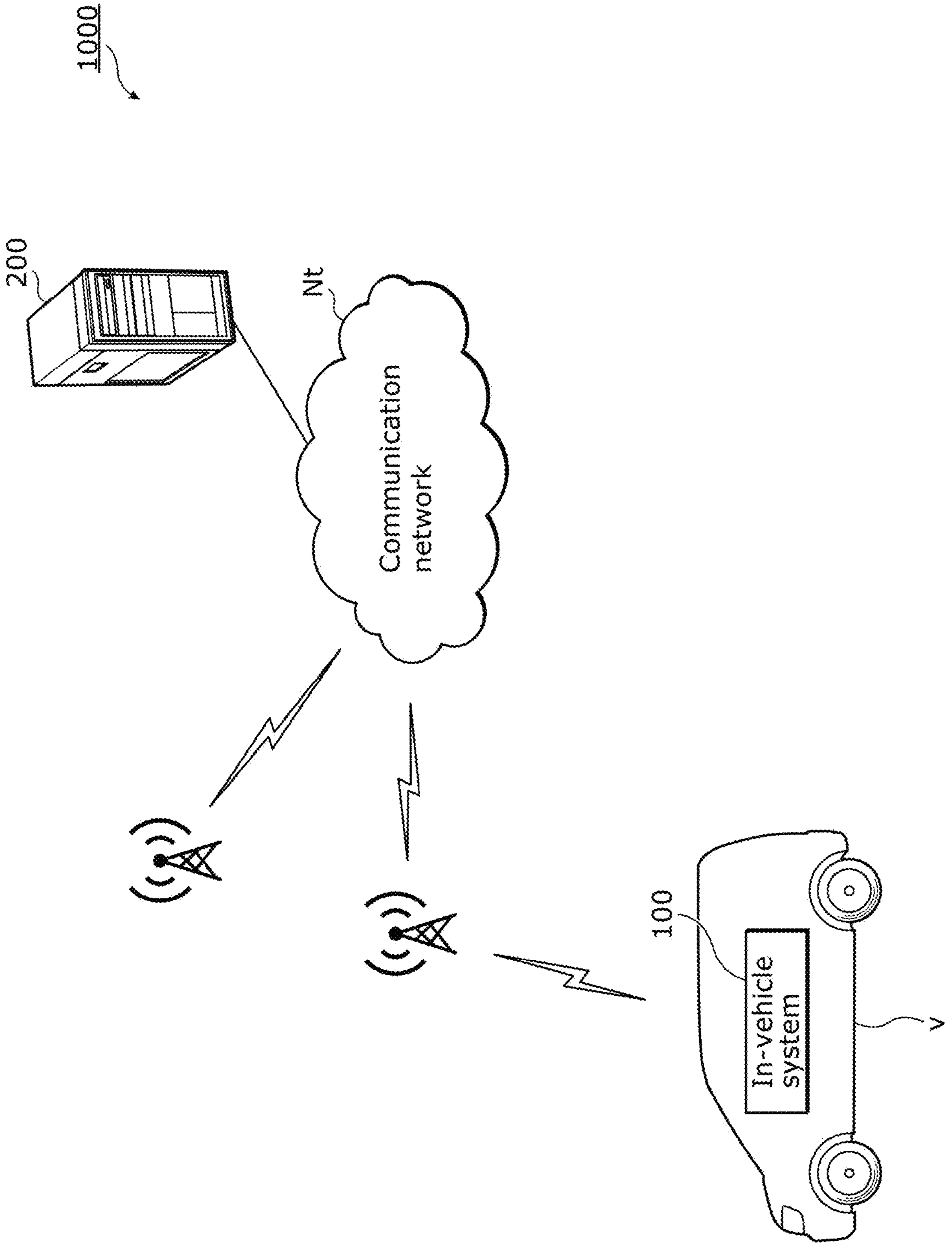
FIG. 1 is a diagram showing an example of a management system in an embodiment.

DESCRIPTION OF EMBODIMENT (Underlying Knowledge Forming Basis of the Present Disclosure)

The present inventor has discovered that the following problem arises with the information processing device of PTL 1 described in the “Background” section.

In the information processing device of PTL 1, the method of obtaining and notifying response instructions differs depending on whether wireless communication is possible or not. However, whether wireless communication is possible or not, it is conceivable that the vehicle may be forcibly stopped when it is subjected to a cyber-attack. If the vehicle is forcibly stopped when wireless communication is not possible, the information processing device of PTL 1 notifies the inside of the vehicle of response instructions prepared in advance. This makes it difficult to take more appropriate measures against cyber-attacks while communicating with a security center outside the vehicle. That is, the information processing device of PTL 1 has a problem in that it is difficult to implement appropriate measures against cyber-attacks on the vehicle. In other words, the information processing device of PTL 1 has a problem in that it is insufficient to provide appropriate measures against cyber-attacks on the vehicle.

In order to solve such a problem, a vehicle control device according to Aspect 1 of the present disclosure includes: a detector that detects a cyber-attack on an in-vehicle system provided in a vehicle; a determiner that determines whether a state of the in-vehicle system is an online state or an offline state when the cyber-attack is detected; and a controller that makes a behavior of the vehicle related to travelling of the vehicle different between a case where the state of the in-vehicle system is determined to be the online state by the determiner and a case where the state of the in-vehicle system is determined to be the offline state by the determiner, wherein the online state is a state in which communication is possible between the in-vehicle system and equipment outside the vehicle via a communication network, and the offline state is a state in which communication is not possible between the in-vehicle system and the equipment via the communication network.

Accordingly, when a cyber-attack is detected, the behavior related to travelling of the vehicle differs depending on whether the state of the in-vehicle system is online or offline. Therefore, when the state of the in-vehicle system is online, the vehicle can be caused at that time to execute a behavior that is capable of implementing appropriate measures against a cyber-attack using the communication described above and that is safe. On the other hand, when the state of the in-vehicle system is offline, for example, the vehicle can be caused to execute a behavior that is likely to switch its state to online and is safe. In addition, once the state of the in-vehicle system switches to online, appropriate measures using communication can be implemented against a cyber-attack, as mentioned above. In this way, the vehicle control device of Aspect 1 can implement appropriate measures against cyber-attacks on the vehicle.

In addition, in a vehicle control device according to Aspect 2, when the state of the in-vehicle system is determined to be the online state by the determination process, the controller may stop the vehicle as the behavior of the vehicle. It should be noted that Aspect 2 may depend from Aspect 1.

Accordingly, when the in-vehicle system is online, the vehicle will be stopped, so that at that point appropriate measures using communication mentioned above can be implemented against cyber-attacks and the safety of the vehicle can be ensured.

In addition, in the vehicle control device according to Aspect 3, when the state of the in-vehicle system is determined to be the offline state by the determiner, the controller may cause the vehicle to travel in a fallback operation as the behavior of the vehicle. It should be noted that Aspect 3 may depend from Aspect 1 or Aspect 2. In addition, in the fallback operation, for example, the maximum speed is limited to a speed slower than that in normal driving.

Accordingly, when the in-vehicle system is offline, the vehicle travels in the fallback operation, so that the vehicle can be safely moved from an offline area to an online area. As a result, it is possible to increase the likelihood that the in-vehicle system will switch from offline to online, and ensure the safety of the vehicle.

In addition, in the vehicle control device according to Aspect 4, when the state of the in-vehicle system is determined to have switched from the offline state to the online state by the determiner, the controller may stop the vehicle by causing the vehicle to stop travelling in the fallback operation. It should be noted that Aspect 4 may depend from Aspect 3 which depends from Aspect 1 or Aspect 2.

Accordingly, when the state of the in-vehicle system switches from offline to online, the vehicle will be stopped, so that at that point appropriate measures using communication mentioned above can be implemented against cyber-attacks and the safety of the vehicle can be ensured.

In addition, in a vehicle control device according to Aspect 5, the vehicle control device further includes a surrounding notifier that notifies a surrounding of the vehicle that the vehicle is being subjected to the cyber-attack, and when the state of the in-vehicle system is determined to be the offline state by the determiner, the controller may further cause the surrounding notifier to notify the surrounding that the vehicle is being subjected to the cyber-attack. It should be noted that Aspect 5 may depend from any one of Aspect 1 to Aspect 4. It should be noted that the surrounding notifier notifies people or other vehicles around the vehicle that the vehicle is being subjected to a cyber-attack by flashing headlights or hazard lights of the vehicle, or by wireless communication such as vehicle-to-vehicle communication.

Accordingly, people or other vehicles around the vehicle can know that the vehicle is being subjected to a cyber-attack, specifically, that the in-vehicle system provided in the vehicle is being subjected to cyber-attack. As a result, people or other vehicles around the vehicle can act safely.

In addition, in the vehicle control device according to Aspect 6, the detector may further detect a malfunction of the in-vehicle system, and regardless of a detection result of the cyber-attack, when the state of the in-vehicle system is determined to be the offline state by the determiner and the malfunction of the in-vehicle system is detected by the detector, the controller may cause the vehicle to travel in a fallback operation, and when the state of the in-vehicle system is determined to have switched from the offline state to the online state by the determiner, the controller may cause the in-vehicle system to report the malfunction of the in-vehicle system to the equipment. It should be noted that Aspect 6 may depend from any one of Aspect 1 to Aspect 5.

Accordingly, even if a malfunction occurs in the vehicle to the extent that the vehicle is capable of travelling in a fallback operation, the vehicle can be safely moved from an offline area to an online area, just as when a cyber-attack is detected and the state of the in-vehicle system is offline. When the state of the in-vehicle system switches from offline to online, the malfunction is reported using the above-mentioned communication, so that the in-vehicle system and vehicle can be properly restored.

Furthermore, in the vehicle control device according to Aspect 7, when the controller causes the vehicle to travel in a fallback operation as the behavior of the vehicle, the controller may stop a safety function related to the travelling of the vehicle, and notify an occupant of the vehicle that the safety function has been stopped, by controlling a human machine interface (HMI) provided in the vehicle. It should be noted that Aspect 7 may depend from Aspect 3 or any one of Aspect 4 to Aspect 6 which depends from Aspect 3.

Accordingly, the safety functions of the vehicle are stopped, so that the processing burden on the vehicle can be reduced. Furthermore, even if the safety functions are stopped, the occupants are notified of this, so that the safety can be ensured.

Hereinafter, an embodiment will be described in detail with reference to the drawings.

It should be noted that each of the embodiments described below shows a comprehensive or specific example. The numerical values, shapes, materials, components, the arrangement and connection forms of the components, steps, and the order of steps shown in the following embodiments are merely examples and are not intended to limit the present disclosure. In addition, among the components in the following embodiments, the components that are not described in the independent claims that indicates the broadest concept are described as arbitrary components. In addition, each figure is a schematic view and is not necessarily exactly illustrated. In addition, in each figure, the same components are given the same reference numerals.

EMBODIMENT

FIG. 1 is a diagram showing an example of a management system in the present embodiment.

Management system 1000 is, for example, a system for monitoring or managing the security of vehicle V. In-vehicle system 100 for, for example, automatically driving vehicle V is provided in vehicle V. In a specific example, in-vehicle system 100 is configured with a controller area network (CAN) or the like. Management system 1000 in the present embodiment includes in-vehicle system 100 and management server 200 that can communicate with each other via communication network Nt. It should be noted that, in the present embodiment, management system 1000 includes one in-vehicle system 100, but the number of in-vehicle systems 100 included in management system 1000 is not limited to one and may be multiple.

In-vehicle system 100 collects information related to security within in-vehicle system 100 and transmits the information to management server 200, for example, via one or more base stations and communication network Nt.

When management server 200 obtains the information related to security mentioned above from in-vehicle system 100 of vehicle V, management server 200 determines the risk level of in-vehicle system 100, i.e., the risk level of vehicle V on which in-vehicle system 100 is mounted, based on the information. Then, based on the determined risk level, management server 200 transmits information related to security measures to in-vehicle system 100 via one or more base stations and communication network Nt.

When in-vehicle system 100 obtains information related to security measures from management server 200, in-vehicle system 100 presents the security measures to, for example, the occupants in vehicle V. In addition, in-vehicle system 100 may automatically execute the security measures.

Figure 2:
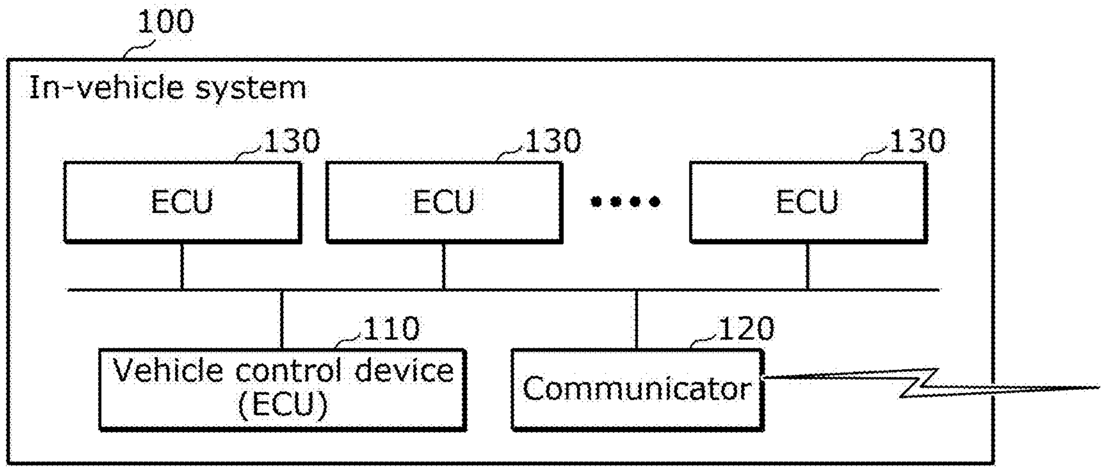
FIG. 2 is a block diagram showing a configuration example of an in-vehicle system in the embodiment.

FIG. 2 is a block diagram showing a configuration example of in-vehicle system 100 in the present embodiment.

In-vehicle system 100 includes vehicle control device 110, communicator 120, and n (n is an integer greater than or equal to 1) electronic control units (ECUs) 130. It should be noted that in-vehicle system 100 may further include other components.

N ECUs 130 perform, for example, vehicle speed control, steering angle control, opening and closing of doors or glass windows, air conditioning control, and the like of vehicle V.

Communicator 120 performs wireless communication with management server 200 via one or more base stations and communication network Nt. The method of this wireless communication is not particularly limited and may be any method.

Vehicle control device 110 monitors a cyber-attack on in-vehicle system 100, and switches the behavior related to travelling of vehicle V by controlling, for example, n ECUs 130 according to the wireless communication state of communicator 120. It should be noted that vehicle control device 110 may be configured as an ECU, or may be configured from a plurality of ECUs.

Figure 3:
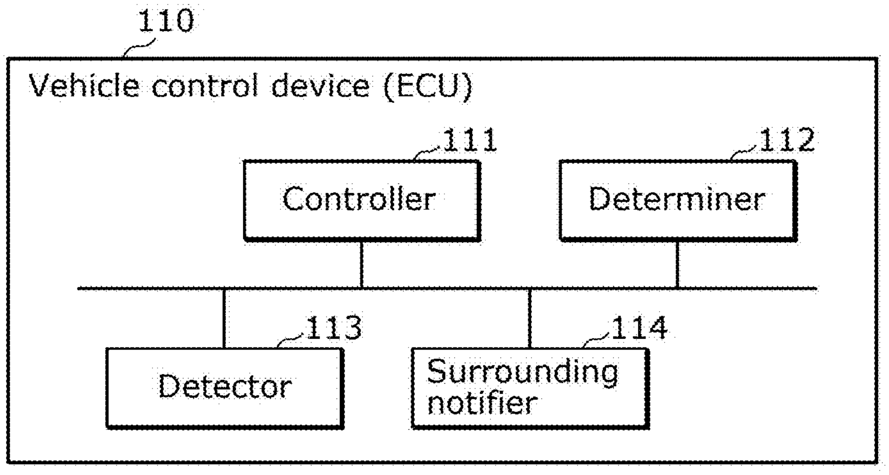
FIG. 3 is a block diagram showing a configuration example of a vehicle control device in the embodiment.

FIG. 3 is a block diagram showing a configuration example of vehicle control device 110.

Vehicle control device 110 includes controller 111, determiner 112, detector 113, and surrounding notifier 114.

Detector 113 detects a cyber-attack on in-vehicle system 100 provided in vehicle V. For example, detector 113 detects a cyber-attack on in-vehicle system 100 by monitoring information such as messages communicated among n ECUs 130. For example, detector 113 detects a cyber-attack when n ECUs 130 are behaving differently from normal. More specifically, detector 113 detects a cyber-attack when messages communicated among n ECUs 130 have predetermined characteristics that differ from normal messages. Alternatively, detector 113 detects a cyber-attack when the amount or number of messages transmitted is greater or less than a predetermined range.

It should be noted that when a cyber-attack is made on in-vehicle system 100 via communication, detector 113 may detect the cyber-attack, or after the cyber-attack has been made, detector 113 may detect the cyber-attack. That is, detector 113 detects a cyber-attack regardless of whether in-vehicle system 100 is in an online or offline state, as mentioned below. For example, a cyber-attack is made when the state of in-vehicle system 100 is online. Then, when some time has passed since the cyber-attack was made, or when a specific mode is activated in in-vehicle system 100, the cyber-attack is detected by detector 113. Therefore, at the time when the cyber-attack is detected, the state of in-vehicle system 100 may be offline.

When a cyber-attack is s detected, determiner 112 determines whether the state of in-vehicle system 100 is online or offline. Here, online is a state in which communication via communication network Nt is possible between communicator 120 of in-vehicle system 100 and management server 200. Offline is a state in which communication via communication network Nt is not possible between communicator 120 of in-vehicle system 100 and management server 200. It should be noted that management server 200 is an example of equipment outside vehicle V. That is, if wireless communication is possible between communicator 120 and management server 200, determiner 112 determines that the state of in-vehicle system 100 or vehicle V is online. On the other hand, if wireless communication is not possible between communicator 120 and management server 200, determiner 112 determines that the state of in-vehicle system 100 or vehicle V is offline. In a specific example, if the radio wave strength transmitted from the base station in response to the output signal from management server 200 is greater than or equal to a threshold, determiner 112 determines that wireless communication is possible, and if the radio wave strength is less than the threshold, it determines that wireless communication is impossible.

Surrounding notifier 114 notifies the surroundings of vehicle V that it is being subjected to a cyber-attack. For example, surrounding notifier 114 notifies the surroundings of vehicle V that it is being subjected to a cyber-attack by, for example, blinking the headlights and hazard lights of vehicle V. That is, surrounding notifier 114 notifies people or other vehicles around vehicle V. The range around vehicle V may be, for example, a range in which vehicle V is visible to the human eye, or may be a predetermined range such as a range within a radius of 10 m from vehicle V. In addition, surrounding notifier 114 may notify other vehicles parked or travelling around vehicle V by wireless communication. This notification by wireless communication is a notification that is performed directly between vehicle V and other vehicles via no communication network Nt, and is also called a notification by vehicle-to-vehicle communication (i.e., V2V). In addition, Bluetooth (registered trademark) or the like may be used as a method of vehicle-to-vehicle communication.

Controller 111 makes the behavior of vehicle V related to travelling of vehicle V different between a case where determiner 112 determines that the state of in-vehicle system 100 is online and a case where determiner 112 determines that the state of in-vehicle system 100 is offline. That is, controller 111 makes the behavior related to travelling of vehicle V different by controlling n ECUs 130.

Accordingly, when a cyber-attack is detected, the behavior related to travelling of the vehicle differs depending on whether the state of in-vehicle system 100 is online or offline. Therefore, when the state of in-vehicle system 100 is online, vehicle V can be caused at that time to execute a behavior that is capable of implementing appropriate measures against a cyber-attack using communication and that is safe. It should be noted that the appropriate measures using communication are measures using communication via communication network Nt between in-vehicle system 100 and management server 200. In addition, the behavior is, for example, stopping, as mentioned below.

On the other hand, when the state of in-vehicle system 100 is offline, for example, vehicle V can be caused to execute a behavior that is likely to switch its state to online and is safe. It should be noted that such behavior is, for example, travelling in a fallback operation, as mentioned below. In addition, if the state of in-vehicle system 100 is switched to online as a result of such behavior, appropriate measures using communications can be implemented against cyber-attacks. In this way, vehicle control device 110 according to the present embodiment can implement appropriate measures against cyber-attacks on vehicle V.

Figure 4:
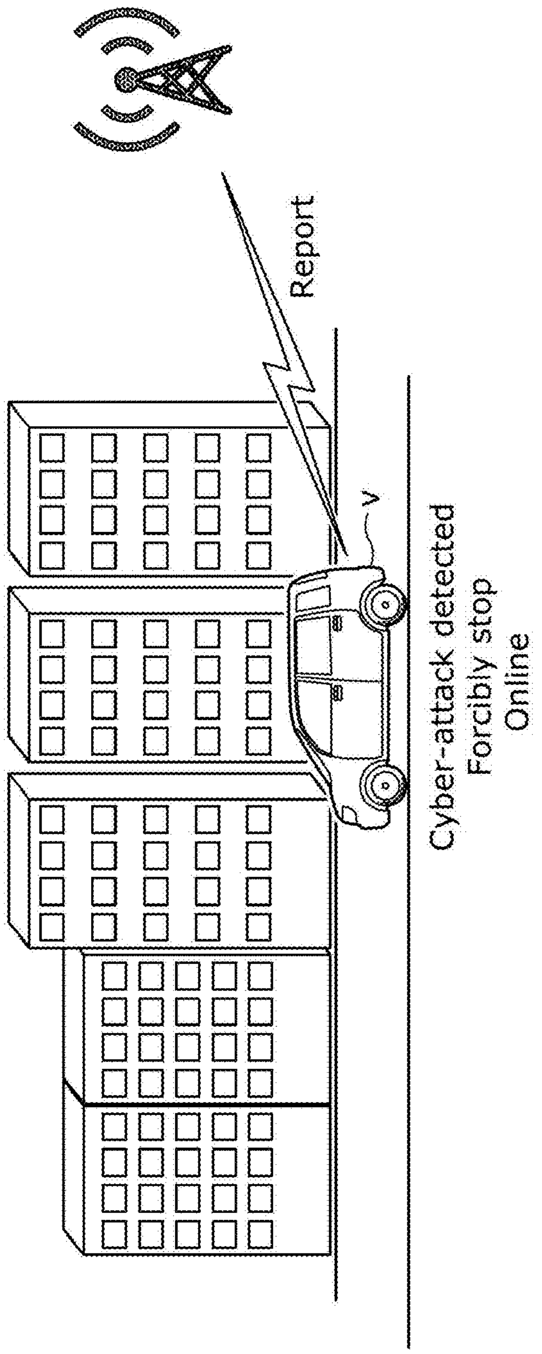
FIG. 4 is a diagram showing an example of a behavior of vehicle V when the state of the in-vehicle system in the embodiment is online.

FIG. 4 is a diagram showing an example of the behavior of vehicle V when the state of in-vehicle system 100 is online.

If determiner 112 determines that the state of in-vehicle system 100 is online when a cyber-attack is detected, controller 111 causes vehicle V to stop as a behavior of vehicle V. For example, controller 111 forcibly stops vehicle V regardless of whether the driver of vehicle V is manually driving the vehicle. Controller 111 then collects information related to the cyber-attack as the information related to security mentioned above, and causes communicator 120 to transmit the information to management server 200. That is, controller 111 causes communicator 120 to report to management server 200. The information related to the cyber-attack includes the fact that the cyber-attack was subjected to, the details of the cyber-attack, and a request for measures against the cyber-attack (i.e., security measures).

In response to the report, communicator 120 obtains information related to the security measures from management server 200 via communication network Nt. As a result, controller 111 presents the security measures to, for example, the occupants of vehicle V. Specifically, controller 111 displays an image showing the security measures on the display of vehicle V. In addition, controller 111 may automatically execute the security measures by controlling n ECUs 130. This makes it possible to implement appropriate measures against the cyber-attack.

In this way, when the state of in-vehicle system 100 is online, vehicle V is stopped, so that at that point appropriate measures using communication mentioned above can be implemented against the cyber-attack and the safety of vehicle V can be ensured.

Figure 5:
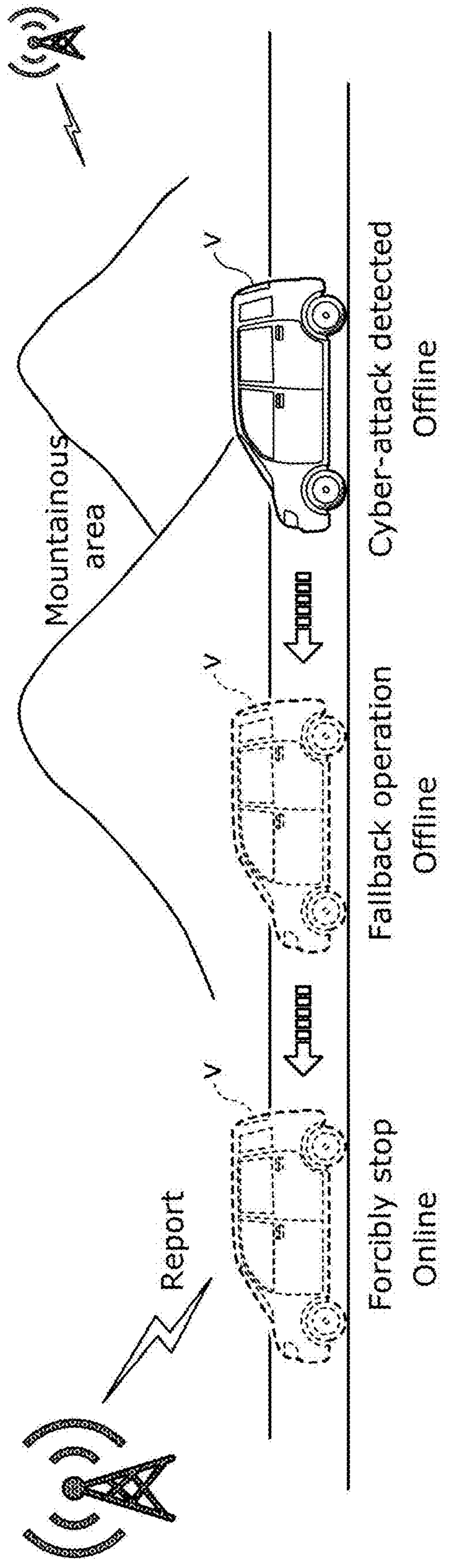
FIG. 5 is a diagram showing an example of a behavior of vehicle V when the state of the in-vehicle system in the embodiment is offline.

FIG. 5 is a diagram showing an example of the behavior of vehicle V when the state of in-vehicle system 100 is offline.

When determiner 112 determines that the state of in-vehicle system 100 is offline when a cyber-attack is detected, controller 111 causes vehicle V to travel in a fallback operation as the behavior of vehicle V. For example, as shown in FIG. 5, determiner 112 determines that the state of in-vehicle system 100 is offline when vehicle V is travelling in a place where radio waves from a base station are difficult to reach, such as a mountainous area. It should be noted that determiner 112 may also determine that the state of in-vehicle system 100 is offline when vehicle V is travelling in a tunnel or the like. Then, unlike when the state of in-vehicle system 100 is online, controller 111 causes vehicle V to travel in a fallback operation as mentioned above, without forcibly stopping vehicle V. The fallback operation is a mode in which the functions or performance of in-vehicle system 100 or vehicle V are partially suppressed. In a specific example, the fallback operation limits the maximum speed of vehicle V. For example, even if the maximum speed of vehicle V is 180 km/h, in the fallback operation, the maximum speed is limited to 10 km/h. That is, controller 111 causes vehicle V to continue travelling at a low speed without stopping.

In this way, when the state of in-vehicle system 100 is offline, vehicle V travels in a fallback operation, so that vehicle V can be safely moved from an offline area to an online area. As a result, the possibility that in-vehicle system 100 will switch from offline to online can be increased, and the safety of vehicle V can be ensured.

Then, when determiner 112 determines that the state of in-vehicle system 100 has switched from offline to online, controller 111 stops vehicle V by causing vehicle V to stop travelling in the fallback operation. That is, when vehicle V moves from an offline area to an online area by travelling in the fallback operation, controller 111, as in the example of FIG. 4, for example, forcibly stops vehicle V regardless of manual driving by the driver of vehicle V. Then, controller 111 causes communicator 120 to execute a report to management server 200.

In response to the report, communicator 120 obtains information related to security measures from management server 200 via communication network Nt. As a result, controller 111 presents the security measures to, for example, the occupants of vehicle V. In addition, controller 111 may automatically execute the security measures by controlling n ECUs 130. This makes it possible to implement appropriate measures against the cyber-attack.

In this way, when the state of in-vehicle system 100 switches from offline to online, vehicle V stops, so that at that point appropriate measures using communication mentioned above can be implemented against the cyber-attack and the safety of vehicle V can be ensured.

Figure 6:
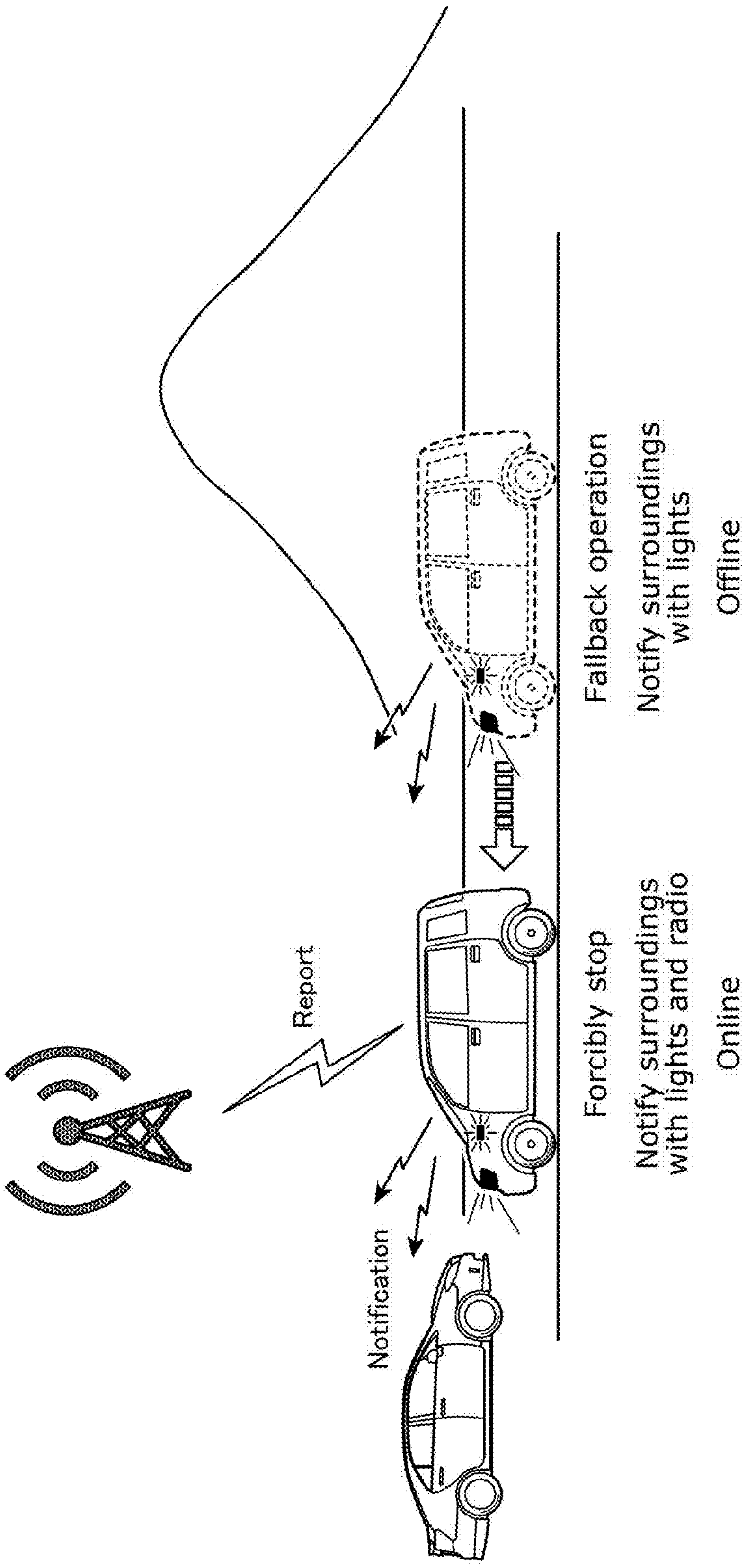
FIG. 6 is a diagram for explaining the operation of the surrounding notifier in the embodiment.

FIG. 6 is a diagram for explaining the operation of surrounding notifier 114.

If determiner 112 determines that the state of in-vehicle system 100 is offline when a cyber-attack is detected, controller 111 further causes surrounding notifier 114 to notify the surroundings that in-vehicle system 100 is being subjected to a cyber-attack. For example, surrounding notifier 114 notifies the surroundings of vehicle V by blinking the headlights and hazard lights of vehicle V, and further notifies the surroundings of vehicle V by vehicle-to-vehicle communication. In addition, if determiner 112 determines that the state of in-vehicle system 100 has switched from offline to online, controller 111 stops vehicle V and causes communicator 120 to report to management server 200. At this time, controller 111 may also cause surrounding notifier 114 to notify the surroundings that in-vehicle system 100 is being subjected to a cyber-attack.

In this way, people or other vehicles around vehicle V can know that vehicle V is being subjected to a cyber-attack, specifically, that in-vehicle system 100 provided in vehicle V is being subjected to a cyber-attack. As a result, people or other vehicles around it can act safely.

Figure 7:
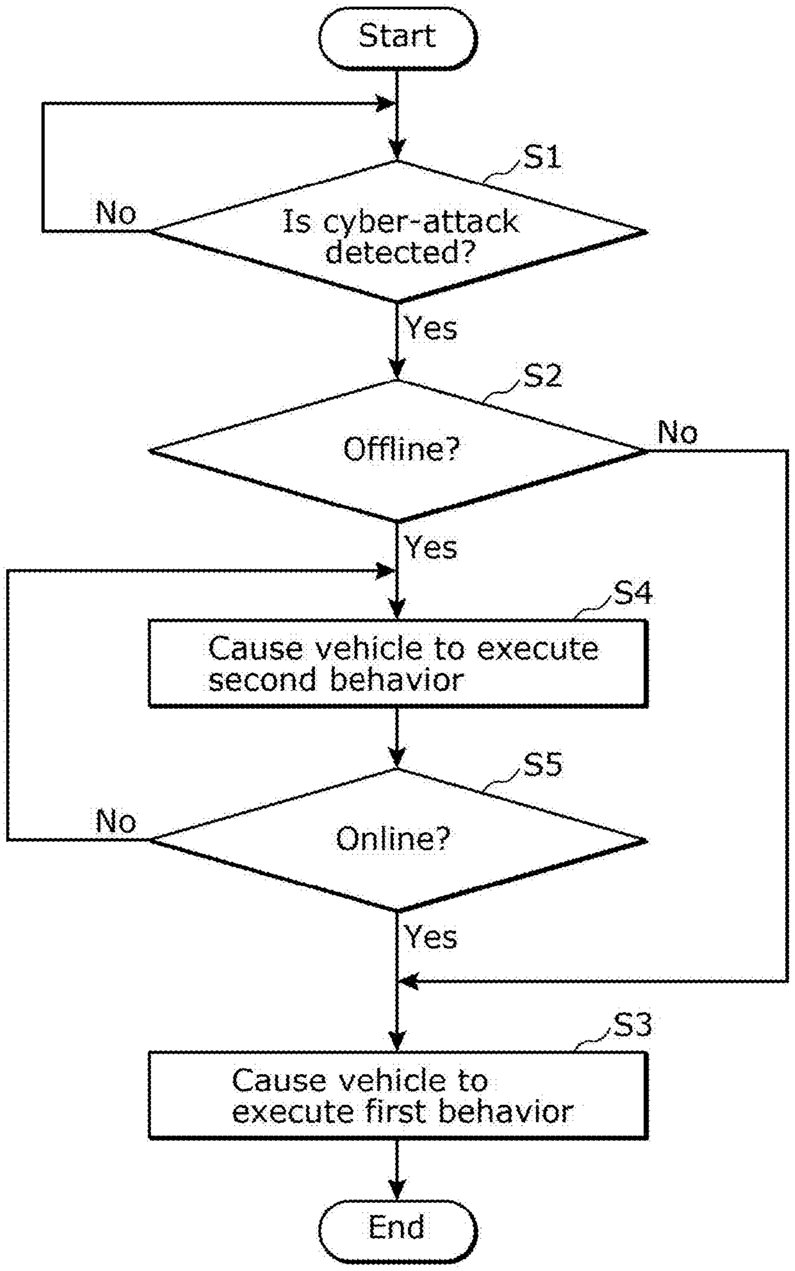
FIG. 7 is a flowchart showing an example of the processing operation of the vehicle control device in the embodiment.

FIG. 7 is a flowchart showing an example of the processing operation of vehicle control device 110 in the present embodiment.

First, detector 113 of vehicle control device 110 detects whether in-vehicle system 100 has been subjected to a cyber-attack (step S1). Here, if detector 113 detects that in-vehicle system 100 has not been subjected to a cyber-attack (No in step S1), detector 113 repeats the process of step S1. On the other hand, if detector 113 detects a cyber-attack (Yes in step S1), determiner 112 determines whether the state of in-vehicle system 100 is offline (step S2).

Here, when determiner 112 determines that the state of in-vehicle system 100 is not offline, i.e., online (No in step S2), controller 111 causes vehicle V to execute a first behavior (step S3). The first behavior is, for example, the stopping of the vehicle V mentioned above. On the other hand, when determiner 112 determines that the state of in-vehicle system 100 is offline (Yes in step S2), controller 111 causes vehicle V to execute a second behavior (step S4). The second behavior is, for example, the travelling of vehicle V in a fallback operation mentioned above.

After the process of step S4, determiner 112 determines whether the state of in-vehicle system 100 is online (step S5). That is, determiner 112 determines whether the state has switched from offline to online. Here, if determiner 112 determines that the state of in-vehicle system 100 is not online, i.e., has not switched to online (No in step S5), controller 111 continues to execute the process of step S4. On the other hand, if determiner 112 determines that the state of in-vehicle system 100 is online, i.e., has switched to online (Yes in step S5), controller 111 executes the process of step S3. That is, controller 111 causes vehicle V to execute the first behavior.

In this way, vehicle control device 110 in the present embodiment can implement appropriate measures against cyber-attacks on vehicle V.

While the vehicle control device and vehicle control method of the present disclosure have been described above based on the embodiment described above, the present disclosure is not limited to the embodiment described above. Forms obtained by applying various modifications to the embodiment conceived by a person skilled in the art without departing from the spirit of the present disclosure may also be included in the present disclosure.

For example, in the embodiment described above, vehicle control device 110 makes the behavior of vehicle V related to travelling of vehicle V different depending on whether the state of in-vehicle system 100 is online or offline when a cyber-attack is detected, but also when a malfunction is detected, the same processing operation may be performed. Specifically, detector 113 further detects a malfunction in in-vehicle system 100. Then, regardless of the detection result of the cyber-attack, when determiner 112 determines that the state of in-vehicle system 100 is offline and detector 113 detects a malfunction in in-vehicle system 100, controller 111 causes vehicle V to travel in a fallback operation. In addition, when determiner 112 determines that the state of in-vehicle system 100 has switched from offline to online, controller 111 causes in-vehicle system 100 to report the malfunction in in-vehicle system 100 to management server 200. That is, controller 111 causes communicator 120 of in-vehicle system 100 to report the malfunction. It should be noted that the malfunction may be a malfunction in vehicle V. In addition, at this time, controller 111 may use a display, a speaker, or the like within vehicle V to notify the occupants of vehicle V recommending that they contact the dealer of vehicle V.

Accordingly, even if a malfunction occurs in vehicle V to the extent that vehicle V is capable of travelling in a fallback operation, vehicle V can be safely moved from an offline area to an online area, just as when a cyber-attack is detected and the state of in-vehicle system 100 is offline. When the state of in-vehicle system 100 switches from offline to online, the malfunction is automatically reported, so that in-vehicle system 100 and vehicle V can be properly restored.

In addition, in the embodiment described above, vehicle control device 110 is included in in-vehicle system 100, but it does not have to be included in in-vehicle system 100. In addition, in the embodiment described above, vehicle control device 110 is configured as an ECU, but it does not have to be configured as an ECU.

In addition, in the embodiment described above, when the state of in-vehicle system 100 is offline, travelling in a fallback operation is performed as the second behavior of vehicle V, but the second behavior is not limited to travelling in a fallback operation and may be another behavior.

In addition, in the fallback operation, the maximum speed of vehicle V is limited, but other parameters or functions of vehicle V may be limited. For example, in the fallback operation, in addition to limiting the maximum speed, a safety function such as autonomous emergency braking (AEB) may be stopped. In addition, when the safety function is stopped, controller 111 may notify the occupants of vehicle V that the safety function has been stopped, by using a human machine interface (HMI) in vehicle V. For example, controller 111 displays a message such as "AEB is stopped" on a display. Alternatively, controller 111 outputs the message by voice from a speaker. It should be noted that a display, a speaker, and the like are examples of an HMI. In this way, when controller 111 causes vehicle V to perform travelling in a fallback operation as the behavior of vehicle V, controller 111 stops the safety functions related to the travelling of vehicle V and notifies the occupants of vehicle V that the safety functions have been stopped, by controlling the HMI provided in vehicle V. Accordingly, the safety functions of vehicle V are stopped, so that the processing load on vehicle V can be reduced. Furthermore, even if the safety functions are stopped, the occupants are notified of it and the maximum speed is restricted, so that the safety can be ensured.

It should be noted that in the embodiment described above, each component may be configured with a dedicated circuit or hardware, or may be realized by executing a software program suitable for each component. Each component may be realized by a program executor such as a central processing unit (CPU) or processor reading and executing a software program recorded on a recording medium such as a hard disk or semiconductor memory. Here, the program, which is software that realizes the device or system of the embodiment described above, causes a computer to execute each step included in the flowchart in FIG. 7.

It should be noted that the following cases are also included in the present disclosure:

(1) The device or system described above may specifically be a computer system including a microprocessor, read only memory (ROM), random access memory (RAM), a hard disk unit, a display unit, a keyboard, a mouse, and the like. A computer program is stored in the RAM or hard disk unit. The device or system described above achieves its functions by the microprocessor operating in accordance with the computer program. Here, a computer program is a combination of a plurality of instruction codes that indicate commands to a computer to achieve a predetermined function.

(2) Some or all of the components included in the device or system described above may be included in a single system large scale integration (LSI). A system LSI is an ultra-multifunctional LSI manufactured by integrating a plurality of components on a single chip, and specifically, is a computer system including a microprocessor, ROM, RAM, and the like. A computer program is stored in the RAM. The system LSI achieves its functions by the microprocessor operating in accordance with the computer program.

(3) Some or all of the components included in the device or system described above may be included in an IC card or a stand-alone module that can be attached to or detached from the device or system. The IC card or module is a computer system including a microprocessor, ROM, RAM, and the like. The IC card or module may include the ultra-multifunction LSI described above. The IC card or module achieves its functions by the microprocessor operating in accordance with a computer program. This IC card or module may be tamper-resistant.

(4) The present disclosure may include a method corresponding to the device or system described above. In addition, the present disclosure may include a computer program for implementing such a method by a computer, or a digital signal consisting of a computer program.

In addition, the present disclosure may be a computer-readable recording medium having recorded thereon a computer program or a digital signal, such as a flexible disk, a hard disk, a compact disc (CD)-ROM, a DVD, a DVD-ROM, a DVD-RAM, a Blu-ray disc (registered trademark) (BD), semiconductor memory, or the like. In addition, the present disclosure may be a digital signal recorded on such a recording medium.

In addition, the present disclosure may include transmitting a computer program or a digital signal via a telecommunications line, a wireless or wired communication line, a network such as the Internet, data broadcasting, or the like.

In addition, the program or digital signal may be implemented by another independent computer system by recording the program or digital signal on a recording medium and transferring it, or by transferring the program or digital signal via a network or the like.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in their entirety: Japanese Patent Application No. 2024-029692 filed on Feb. 29, 2024.

INDUSTRIAL APPLICABILITY

The vehicle control device of the present disclosure can implement appropriate measures against cyber-attacks on a vehicle, and can be applied, for example, to devices, systems, or the like provided in a vehicle.

The invention claimed is:

1. A vehicle control device, comprising:

a memory including a program; and a processor connected to the memory that, when executing the program:

detects a cyber-attack on an in-vehicle system provided in a vehicle;

determines, when the cyber-attack is detected on the in-vehicle system, whether a state of the in-vehicle system is an online state or an offline state, the online state of the in-vehicle system being a state in which communication between the in-vehicle system and a management server via a network is possible, the offline state of the in-vehicle system being a state in which the communication between the in-vehicle system and the management server via the network is not possible; and controls a behavior of the vehicle related to travelling of the vehicle different between a first case where the state of the in-vehicle system is determined to be the online state and a second case where the state of the in-vehicle system is determined to be the offline, and the behavior of the vehicle related to the travelling in the second case includes causing the vehicle to travel, in a fallback operation, to an online area in which the state of the vehicle switches from the offline state to the online state.

2. The vehicle control device according to claim 1, wherein the processor, when the state of the in-vehicle system is determined to be the online state in the first case, stops the vehicle as the behavior of the vehicle.

3. The vehicle control device according to claim 1, wherein the processor, when the state of the in-vehicle system is determined to be the offline state in the second case, causes the vehicle to travel in the fallback operation as the behavior of the vehicle.

4. The vehicle control device according to claim 3, wherein the processor, when the state of the in-vehicle system is determined to have switched from the offline state to the online state, stops the vehicle by causing the vehicle to stop travelling in the fallback operation.

5. The vehicle control device according to claim 1, wherein the processor, when the state of the in-vehicle system is determined to be the offline state in the second case, notifies a surrounding of the vehicle that the vehicle is being subjected to the cyber-attack.

6. The vehicle control device according to claim 1, wherein the processor further detects a malfunction of the in-vehicle system, and the processor, regardless of a detection result of the cyber-attack, when the state of the in-vehicle system is determined to be the offline state and the malfunction of the in-vehicle system is detected, the processor causes the vehicle to travel in the fallback operation, and when the state of the in-vehicle system is determined to have switched from the offline state to the online state, the processor causes the in-vehicle system to report the malfunction of the in-vehicle system to the management server.

7. The vehicle control device according to claim 3, wherein, when the processor causes the vehicle to travel in the fallback operation as the behavior of the vehicle, the processor stops a safety function related to the travelling of the vehicle, and notifies an occupant of the vehicle that the safety function has been stopped, by controlling a human machine interface (HMI) provided in the vehicle.

8. The vehicle control device according to claim 1, wherein the fallback operation forcibly stops the vehicle when the state of the vehicle switches from the offline state to the online state.

9. The vehicle control device according to claim 1, wherein the fallback operation is a mode in which a maximum speed of the vehicle is limited.

10. The vehicle control device according to claim 1, wherein the fallback operation is a mode in which the vehicle travels without stopping.

11. A vehicle control method by which a computer controls a vehicle, the vehicle control method comprising:

detecting a cyber-attack on an in-vehicle system provided in the vehicle;

determining whether a state of the in-vehicle system is an online state or an offline state when the cyber-attack is detected, the online state of the in-vehicle system being a state in which communication between the in-vehicle system and a management server via a network is possible, the offline state of the in-vehicle system being a state in which the communication between the in-vehicle system and the management server via the network is not possible; and controlling a behavior of the vehicle related to travelling of the vehicle different between a first case where the state of the in-vehicle system is determined to be the online state and a second case where the state of the in-vehicle system is determined to be the offline state, wherein the behavior of the vehicle related to the travelling in the second case includes causing the vehicle to travel, in a fallback operation, to an online area in which the state of the vehicle switches from the offline state to the online state.

* * * * *